United States Patent [19]

Houde

[11] Patent Number: 5,797,093
[45] Date of Patent: Aug. 18, 1998

[54] ROUTING OF AN EMERGENCY CELLULAR TELEPHONE CALL

[75] Inventor: Michel Houde, St. Laurent, Canada

[73] Assignee: Telefonaktiebolaget LM Ericsson, Stockholm, Sweden

[21] Appl. No.: 593,861

[22] Filed: Jan. 30, 1996

[51] Int. Cl.⁶ ..................... H04Q 7/22
[52] U.S. Cl. ............ 455/404; 455/432; 455/439; 455/445; 455/560
[58] Field of Search .................. 455/404, 422, 455/432, 414, 435, 445, 456, 379, 517, 521, 436, 524; 379/45

[56] References Cited

U.S. PATENT DOCUMENTS

| | | |
|---|---|---|
| 4,916,728 | 4/1990 | Blair . |
| 5,153,902 | 10/1992 | Buhl et al. ........................ 455/458 |
| 5,369,681 | 11/1994 | Boudreau et al. ................. 455/458 |
| 5,369,684 | 11/1994 | Buhl et al. ........................ 455/458 |
| 5,388,147 | 2/1995 | Grimes ............................. 455/404 |
| 5,519,760 | 5/1996 | Borkowski et al. ............... 455/404 |
| 5,561,840 | 10/1996 | Avesalo et al. ................... 455/458 |

*Primary Examiner*—Dwayne Bost
*Assistant Examiner*—Linwood C. Scott, Jr.
*Attorney, Agent, or Firm*—Jenkens & Gilchrist, P.C.

[57] ABSTRACT

A cellular telephone network including a plurality of service areas each served by a different mobile switching center wherein messages are transmitted between mobile switching centers, accounting for instances of inter-service area handoff of a mobile subscriber cellular call, to identify the public safety answering point (PSAP) system to be utilized in answering an emergency telephone call from the mobile subscriber. When multiple inter-service area handoffs have occurred, the PSAP identification message is sent from the serving mobile switching center to the anchor mobile switching center to allow for the identification of the appropriate PSAP. This message could be relayed through one or more intermediate tandem mobile switching centers.

10 Claims, 2 Drawing Sheets

ROUTING OF AN EMERGENCY CELLULAR TELEPHONE CALL

BACKGROUND OF THE INVENTION

1. Technical Field of the Invention

The present invention relates to cellular telephone networks and, in particular, to the routing of emergency telephone calls through a cellular telephone network.

2. Description of Related Art

In an emergency situation, it is vitally important for the providers of emergency services, such as fire, police and rescue departments, to have access to location information regarding the site of the emergency such that emergency personnel and equipment may be properly and timely dispatched. In some instances, however, the nature of the emergency makes it difficult, if not impossible, for the person reporting the emergency situation to provide the necessary location information regarding the site of the emergency. For example, the person reporting the emergency may be incapacitated or otherwise unable to orally report his or her location to the emergency services personnel.

The providers of emergency services have been greatly aided in their efforts to provide emergency services to individuals in need by the introduction of 911 emergency dialing services through the telephone network. One important aspect of the 911 emergency service is that the public safety answering point (PSAP) system utilized to answer the emergency telephone call obtains from the telephone system the telephone number of the telephone from which the emergency is being reported. Utilizing this telephone number, the PSAP system accesses a database containing information relating telephone numbers to names and addresses of telephone customers, and retrieves the name and billing address of the telephone customer having the telephone number from which the emergency call was initiated. Other information, like a home address if different from the billing address and special medical information, is also available from the database. For an emergency call originated from a fixed (i.e., landline serviced) telephone, the retrieved billing address information most often comprises a location address for the telephone customer, and is thus advantageously used to direct the provision of emergency services in instances where the calling party is incapable of supplying this location information or does not have sufficient time to supply the information.

When a mobile subscriber initiates the emergency telephone call from a cellular telephone and reports an emergency situation, however, the billing address information capable of being retrieved by the PSAP system for the cellular caller is of no value in determining the present location of that mobile subscriber. Current cellular telephone technology, by itself, does not include the capability of pinpointing, with any reasonable or useful degree of accuracy, the location of the mobile subscriber. Accordingly, a number of systems have been proposed to assist in the location determination. On system utilizes a triangulation process to determine an approximate location of the caller through an analysis of signal strength measurements and/or propagation delay times of the cellular communications. Another system utilizes the existing Global Positioning System (GPS) with a GPS receiver attached to the cellular telephone to obtain geo-coordinates for the mobile subscriber, with the obtained coordinates being transmitted to the PSAP system for use in dispatching the emergency services.

Knowing the location of the mobile subscriber does not comprise the only concern in rendering emergency services in response to a cellular 911 emergency call. It is also important that the emergency cellular call be routed to the proper PSAP system when the mobile subscriber roams away from its home area. For example, consider the situation where a mobile subscriber is engaged in a cellular call. As the subscriber moves through the service area, a handoff of the call will likely occur from a cell assigned to one mobile switching center (the anchor MSC) to a cell assigned to another mobile switching center (the serving MSC). This handoff does not affect the continuation of the cellular call. It may, however, affect the routing of an emergency services call. If the subscriber puts a first cellular call on hold, and then initiates a second, cellular emergency services call, the emergency call is blindly routed by the serving MSC to the anchor MSC which then sends the call to the PSAP system associated with the anchor MSC. In the event that the PSAP system associated with the anchor MSC differs from the PSAP system associated with the serving MSC, the emergency call is routed incorrectly, thus possibly delaying the dispatching of emergency services personnel to assist the mobile subscriber.

Accordingly, there is a need for a system and method for insuring that emergency service calls from mobile subscribers are properly routed through the cellular telephone network to the correct PSAP system for processing and response.

SUMMARY OF THE INVENTION

In a cellular telephone network including a plurality of service areas each served by a different mobile switching center, means are provided in each mobile switching center for signaling other mobile switching centers (in instances of inter-service area handoff of a mobile subscriber cellular call) with information allowing for the identification of the public safety answering point (PSAP) system utilized to answer 911 emergency telephone calls in the service area where the mobile subscriber is currently located. This information could include one or more of the following: routable number, reference to a routable number, or identification of serving (anchor) MSC with which to deduce the correct PSAP using a look-up table. When multiple inter-service area handoffs have occurred, the PSAP identification is sent by the serving mobile switching center to the anchor mobile switching center at the time of call initiation. When necessary, the PSAP identification is relayed through intermediate tandem mobile switching centers before reaching the anchor mobile switching center. Accordingly, the emergency call is routed from the anchor mobile switching center to the appropriate PSAP as specified by the PSAP identification instead of being improperly routed to the PSAP system of the anchor mobile switching center.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
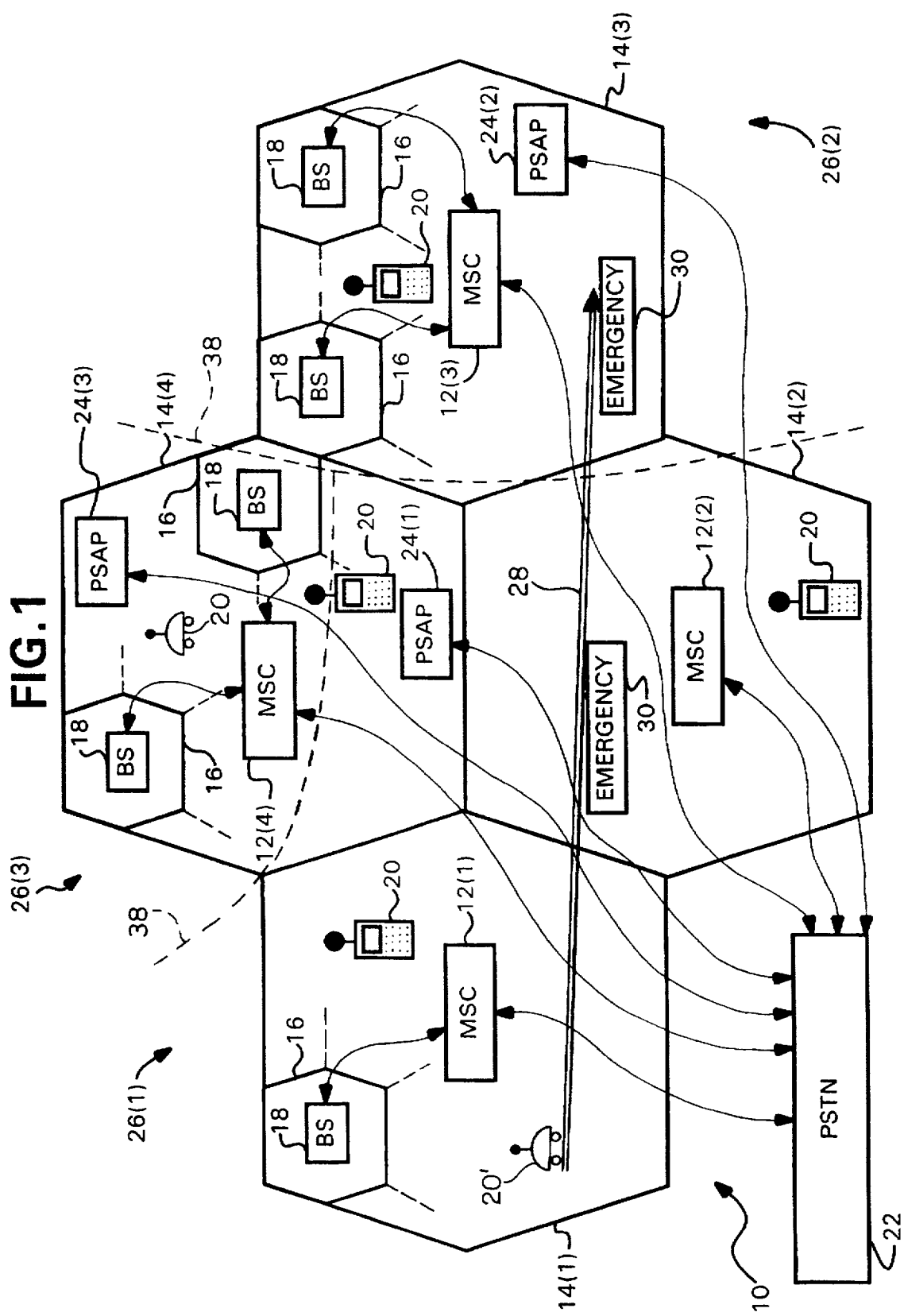
FIG. 1 is a block diagram of a cellular telephone system connected to a plurality of public safety answering point systems.

Reference is now made to FIG. 1 wherein there is shown a block diagram of a cellular telephone system 10 providing cellular telephone service throughout a geographic area. The cellular telephone system 10 comprises a plurality of mobile switching centers (MSC) 12 each controlling the provision of cellular telephone service in one particular service area 14 within the geographic area. Each service area 14 comprises a plurality of cells 16 (only a few shown for simplification of the illustration), wherein each cell includes at least one base station (BS) 18 for effectuating radio frequency communications with proximately located mobile stations (MS) 20. The base stations 18 are connected for communications with the mobile switching center 12 for the service area 14 within which the cells 16 for those base stations are located. The mobile switching centers 12 are connected for communications to the public switched telephone network (PSTN) 22.

The general operation of the cellular telephone network 10 like that shown in FIG. 1 to provide telephonic communication with the mobile stations 20 is well known to those skilled in the art, and will not be described in detail herein. The telephone network may comprise an analog advanced mobile phone system (AMPS), a Group Special Mobile (GSM) system, a digital D-AMPS system, a time division multiple access (TDMA) system, a code division multiple access (CDMA) system, or the like.

Connected to the public switched telephone network 22 are a plurality of public safety answering point (PSAP) systems 24. Each public safety answering point system 24 is utilized by emergency service providers (such as the police department, fire department, or rescue department) as a central point for the reception of emergency services telephone calls (e.g., dial 911 calls) and the dispatching of emergency services personnel within an associated emergency services area 26. It will be noticed that certain ones of the mobile switching centers 12 (and in general their service areas 14) are located within the emergency service area 26 handled by one public safety answering point system 24, while other mobile switching centers (and service areas) are located within the emergency service area handled by another public safety answering point system. It is also possible that the service area 14 of one mobile switching center 12 may be serviced by more than one public safety answering point system 24 (as generally shown in service area 14(4)). The broken lines 38 indicate the division points between the illustrated emergency service areas 26(1), 26(2) and 26(3).

It is important that any cellular emergency call initiated from a mobile station 20 be handled by the public safety answering point system 24 for the emergency service area 26 within which the mobile station is located. Otherwise the dispatching and/or arrival of emergency aid could be misrouted or delayed. Under normal cellular telephone system operating conditions, this is not a concern as the cellular emergency call is handled by the mobile switching center 12 for the service area 14 where the emergency call is originated (the serving MSC) and routed to the public safety answering point system 24 associated with that particular serving mobile switching center. Similarly, in the event a service area 14 and its mobile switching center 14 are associated with plural public safety answering point systems 24 (like in service area 14(3)), routing is made to the public safety answering point system 24 associated with the cell 16 currently serving the mobile station. When the mobile subscriber is engaged in a first call, and is roaming between the service areas 14, however, a communications link is maintained for that call through the mobile switching center 12 for the service area where the first call was originated (the anchor MSC), and thus any cellular emergency call initiated concurrent with the first call (by placing the first call on hold) is undesireably routed through the anchor mobile switching center and the public switched telephone network 22 to the public safety answering point system 24 associated with that anchor mobile switching center. In that instance, the dispatching and/or arrival of emergency aid may be misrouted or delayed.

The foregoing problem associated with the routing of a cellular emergency call initiated concurrent with an ongoing first call from a inter-service area roaming mobile station 20 may be better understood with reference to a specific example concerning mobile station 20' illustrated as being located in service area 14(1) of FIG. 1. Mobile station 20' is engaged (either through an origination or reception) in a first cellular telephone call in a manner well known to those skilled in the art while located in service area 14(1). This first call is routed through the mobile switching center 12(1) (the anchor MSC) and, possibly, the public switched telephone network 22. Assume now that the mobile station 20' begins to roam, along the path generally indicated by arrow 28, between the service areas 12, and in fact moves from service area 14(1) through service area 14(2) to service area 14(3) without terminating the first call. As the mobile station roams, the system 10 hands off responsibility for that call first to the mobile switching center 12(2) as the serving MSC, and then to the mobile switching center 12(3) as the serving MSC (with the mobile switching center 12(2) then becoming the tandem MSC). All the while, however, the anchor mobile switching center 12(1) remains in the call with the first call communications being routed between the anchor MSC and the serving mobile switching center 12(3) through the tandem mobile switching center 12(2).

If the mobile station 20' were at this point in its travels along arrow 28 to encounter an emergency situation 30 (occurring within cellular service area 14(3) and emergency service area 26(2)) and wish to originate a cellular emergency call concurrent with the continued handling of the first call, the first call may be placed on hold using well known means and the cellular emergency call initiated. Because the first call link with the anchor mobile switching center 12(1) remains in place to continue with the handling of the first call (now on hold), the initiated cellular emergency call is also directed to the anchor mobile switching center through the serving mobile switching center 12(3) and the tandem mobile switching center 12(2). It will be noticed, however, that the emergency service area 26(1) within which the service area 14(1) for the anchor mobile switching center 12(1) is located is different than the emergency service area 26(2) within which the service area 14(3) for the serving mobile switching center 12(3) is located. Accordingly, the initiated cellular emergency call is routed from anchor mobile switching center 12(1) to its public safety answering point system 24(1) for emergency service area 26(1) rather than to public safety answering point system 24(2) for emergency service area 26(2) where the emergency situation 30 is occurring.

Figure 2:
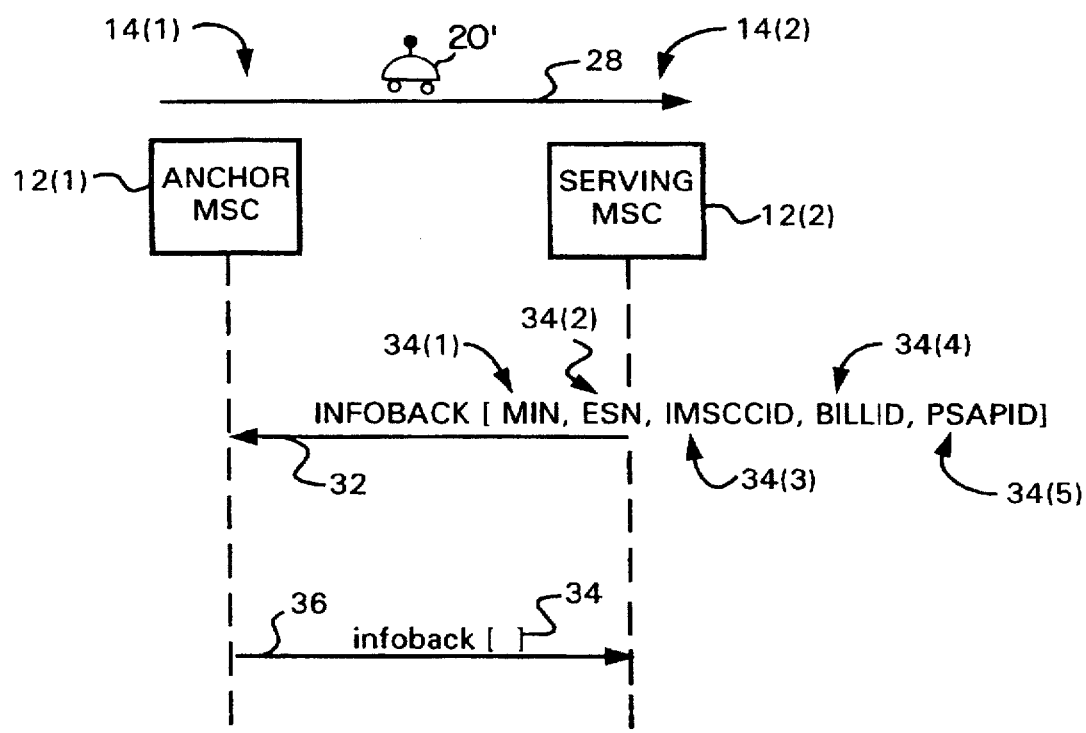
FIGS. 2 and 3 are network messaging diagrams illustrating the flow of messages in the system of FIG. 1 with respect to the reporting of public safety answering point identification information in instances of inter-service area mobile station roaming.
Figure 3:
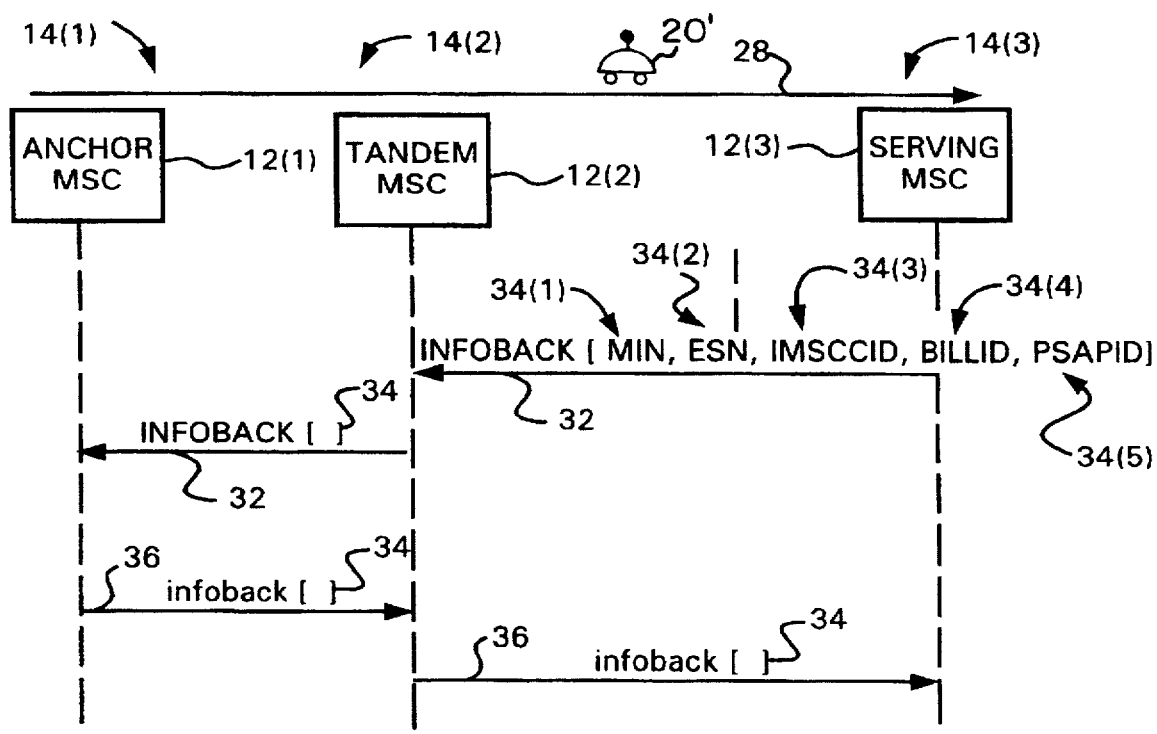

Reference is now made to FIG. 2 and 3 wherein there are shown network messaging diagrams illustrating the flow of signals in the system 10 of FIG. 1 responsive to instances of inter-service area mobile station roaming. When a roaming mobile station 20 initiates a cellular emergency call, the currently serving mobile switching center 12 generates a message 32 including a number of parameters 34 for transmission back to any previously serving mobile switching centers. The message 32 is referred to herein as an Information Backward Invoke (INFOBACK) which is generated to include parameters 34(1)–34(4) comprising the mobile identification number (MIN) of the mobile station 20, the electronic serial number (ESN) of the mobile station, the trunk between the mobile switching centers for carrying the call (IMSCCID—inter mobile switching center circuit identification), and the billing identification number for the call (BILLID), respectively. It will, of course, be understood that the message 32 may include additional or different parameters, if necessary, in accordance with the appropriate proprietary or public communications protocol. The message 32 yet further includes a parameter 34(5) comprising an identification of the public safety answering point system 24 (PSAPID) assigned to emergency service area 26 within which the mobile switching center sending the signal is located. This identification may comprise a routable number, a reference to a routable number, or an identification of the serving MSC from which the PSAP identification may be found through use of a look-up table. Responsive to receipt of the message 32, the receiving mobile switching center 12 generates an acknowledgment message 36 referred to herein as an Information Backward (infoback) message.

With reference now again to FIG. 1 along with FIG. 2, and with particular reference to the example discussed above with respect to roaming mobile station 20', when the mobile station moves from service area 14(1) to service area 14(2), the mobile switching center 12(1) handling a first cellular call when initiated becomes the anchor MSC and the mobile switching center 12(2) for service area 14(2) becomes the serving MSC. When an emergency 30 is encountered in service area 14(2), and a cellular emergency call is initiated (as a subsequent call with any previous call(s) perhaps being placed on hold), the message 32 is generated by serving mobile switching center 12(2) and transmitted to the anchor mobile switching center 12(1). This message 32 includes the parameter 34(5) identifying the public safety answering point system 24 assigned to the emergency service area 26 within which the service area 14(2) for the serving mobile switching center 12(2) is located. The message 32 further includes the IMSCCID parameter 34(3) identifying the circuit connection between the serving mobile switching center 12(2) and the anchor mobile switching center 12(1). Responsive to receipt of the message 32, the acknowledgment message 36 is sent back to the serving mobile switching center 12(2). The anchor mobile switching center 12(1) then accordingly handles the emergency call by routing the call to the public safety answering point system 24 for the serving mobile switching center 12(2) rather than to the public safety answering point system 24 for the anchor mobile switching center 12(1). In this case, the public safety answering point systems 24 for the service areas 14(1) and 14(2) are not different, and thus the message 32 does not change the way the call would have otherwise been handled absent use of the message.

Referring now also to FIG. 3, again with particular reference to the example discussed above with respect to roaming mobile station 20', assume that the mobile station next moves from service area 14(2) to service area 14(3). When the emergency 30 is encountered in service area 14(3), and a cellular emergency call is initiated (as a subsequent call with any previous call(s) perhaps being placed on hold), the message 32 is generated by serving mobile switching center 12(3) and transmitted to the anchor mobile switching center 12(1) via tandem mobile switching center 12(2). This message 32 includes the parameter 34(5) identifying the public safety answering point system 24 assigned to the emergency service area 26 within which the service area 14(3) for the serving mobile switching center 12(3) is located. The included IMSCCID parameter 34(3) in this case identifies the circuit connection between the serving mobile switching center 12(3) and the tandem mobile switching center 12(2). The anchor mobile switching center 12(1) then accordingly handles the emergency call by routing the call to the public safety answering point system 24 for the serving mobile switching center 12(3) rather than to the public safety answering point system 24 for the anchor mobile switching center 12(1). In this case, the public safety answering point systems 24 for the service areas 14(1) and 14(3) are different, and thus the message 32 changes the way the call would have otherwise been handled absent use of the message.

In the situation where one service area 14 and its associated mobile switching center 12 are serviced by plural public safety answering point systems 24 (like in service area 14(4)), the mobile switching center recognizes, in general from the cell 16 serving the mobile station, the location of the mobile station and determines which of the plural public safety answering point systems is the correct system to handle an initiated emergency call. The message 32 generated and transmitted by the mobile switching center 12 then identifies the determined correct public safety answering point system 24 for handling the emergency call.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims. In particular, it will be understood that the present invention may be employed in connection with any cellular telephone system, using any public or private communications protocols.

What is claimed is:

1. A cellular telephone system including a plurality of mobile switching centers, the mobile switching centers generating, to account for instances of mobile station handoff between mobile switching centers, a message identifying an emergency services processing center associated with a currently serving one of the mobile switching centers, the generated message being transmitted from the serving mobile switching center to a previously serving anchor one of the mobile switching centers for use by the anchor mobile switching center in routing an emergency services call made from the mobile station.

2. The system of claim 1 wherein the emergency services processing center comprises a public safety answering point (PSAP) system.

3. The system of claim 1 wherein the message includes a parameter useful in identifying the emergency services processing center associated with the serving mobile switching center.

4. A method for cellular telephone network operation, comprising the steps of:

generating a message at a mobile switching center currently serving a roaming mobile station to account for mobile station handoff from a mobile switching center previously serving the roaming mobile station to the currently serving mobile switching center occurs, the generated message identifying an emergency services processing center associated with the currently serving mobile switching center; and transmitting the message from the currently serving mobile switching center to the previously serving mobile switching center for use by the previously serving mobile switching center in directing an emergency services call initiated by the roaming mobile station.

5. The method as in claim 4 wherein the emergency services processing center comprises a public safety answering point (PSAP) system.

6. The method as in claim 4 wherein includes a parameter useful in identifying the emergency services processing center associated with the serving mobile switching center.

7. A cellular telephone system, comprising:

an anchor mobile switching center handling initiation of a cellular call for a roaming mobile station; and a serving mobile switching center currently handling the cellular call for the roaming mobile station and including means for generating a message transmitted to the anchor mobile switching center, the message identifying an emergency services processing center associated with the serving mobile switching center and used by the anchor mobile switching center in directing an emergency services call made from the roaming mobile station to the identified emergency services processing center.

8. The system of claim 7 further including at least one tandem mobile switching center connected between the serving mobile switching center and the anchor mobile switching center, the message generated by the serving mobile switching center routed through the at least one tandem mobile switching center to the anchor mobile switching center.

9. The system of claim 7 wherein the emergency services processing center comprises a public safety answering point (PSAP) system.

10. The system of claim 7 wherein the message includes a parameter useful in identifying the emergency services processing center associated with the serving mobile switching center.

* * * * *

UNITED STATES PATENT AND TRADEMARK OFFICE
CERTIFICATE OF CORRECTION

PATENT NO. : 5,797,093 Page 1 of 1
DATED : August 18, 1998
INVENTOR(S) : Michel Houde It is certified that error appears in the above-identified patent and that said Letters Patent is hereby corrected as shown below:

<u>Title page,</u>
Item [56], References Cited, U.S. PATENT DOCUMENTS, add
-- 5,018,187    05/21/91        Marinho, et al. --
Item [56], References Cited, add FOREIGN PATENT DOCUMENTS,
94/29995        22/12/94        PCT --
Add -- OTHER PUBLICATIONS,
IBM Technical Disclosure Bulletin,
Vol. 38, No. 5, May 1, 1995; (p. 309); XP 000519589 "Routing of
Calls Based on Geographic Coordinates of Caller" --

Signed and Sealed this

Tenth Day of September, 2002

*Attest:*

*Attesting Officer*

JAMES E. ROGAN
*Director of the United States Patent and Trademark Office*